United States Patent
Collins et al.

(10) Patent No.: US 12,418,695 B2
(45) Date of Patent: Sep. 16, 2025

(54) AUDIO SYNCHRONISATION

(71) Applicant: Darabase Limited, Guildford (GB)

(72) Inventors: Dominic Sinclair Collins, Guildford (GB); David John Bomphrey, Guildford (GB); Mark Richard James, Guildford (GB)

(73) Assignee: Darabase Canada Limited, Toronto (CA)

( * ) Notice: Subject to any disclaimer, the term of this patent is extended or adjusted under 35 U.S.C. 154(b) by 4 days.

(21) Appl. No.: 18/257,142

(22) PCT Filed: Dec. 29, 2021

(86) PCT No.: PCT/GB2021/053439
§ 371 (c)(1),
(2) Date: Jun. 13, 2023

(87) PCT Pub. No.: WO2022/144543
PCT Pub. Date: Jul. 7, 2022

(65) Prior Publication Data
US 2024/0129580 A1    Apr. 18, 2024

(30) Foreign Application Priority Data

Dec. 31, 2020 (GB) .................................. 2020825
Jul. 30, 2021 (GB) .................................. 2111048

(51) Int. Cl.
*H04N 21/439* (2011.01)
*H04N 21/414* (2011.01)
(Continued)

(52) U.S. Cl.
CPC ..... *H04N 21/439* (2013.01); *H04N 21/41415* (2013.01); *H04N 21/4223* (2013.01); *H04N 21/44008* (2013.01); *H04N 21/8547* (2013.01)

(58) Field of Classification Search
CPC ......... H04N 21/23418; H04N 21/2353; H04N 21/25808; H04N 21/25833;
(Continued)

(56) References Cited

U.S. PATENT DOCUMENTS

| 2013/0177203 A1 | 7/2013 | Koo et al. |
| 2013/0183021 A1 | 7/2013 | Osman |

(Continued)

FOREIGN PATENT DOCUMENTS

| CN | 103237203 | 8/2013 |
| GB | 2526330 | 11/2015 |

OTHER PUBLICATIONS

GB2020825.2 Search Report.

*Primary Examiner* — Rong Le
(74) *Attorney, Agent, or Firm* — Renner, Kenner, Greive, Bobak, Taylor & Weber

(57) ABSTRACT

A method of synchronising audio content arranged to be played by a second device with video content played by a first device, wherein the second device includes a camera, comprises: capturing at least a portion of the video content with the camera; performing image recognition on the captured video content to identify a set time point in the audio content; and commencing playing the audio content from a selected time point in the audio content corresponding to the set time point, such that the audio content is synchronous with the video content. A method of pre-preparing video content for use in such a synchronisation method is also described.

20 Claims, 5 Drawing Sheets

(51) Int. Cl.
*H04N 21/4223* (2011.01)
*H04N 21/44* (2011.01)
*H04N 21/8547* (2011.01)

(58) Field of Classification Search
CPC ......... H04N 21/25841; H04N 21/2662; H04N 21/41407; H04N 21/41415; H04N 21/4223; H04N 21/43076; H04N 21/435; H04N 21/439; H04N 21/44008; H04N 21/4722; H04N 21/8106; H04N 21/8455; H04N 21/8547; H04N 9/87; G11B 27/10; G11B 27/28
See application file for complete search history.

(56) References Cited

U.S. PATENT DOCUMENTS

2015/0093096 A1 4/2015 Mishra et al.
2016/0307371 A1 10/2016 Ayers et al.

AUDIO SYNCHRONISATION

This invention relates to methods and apparatuses for synchronising video content displayed by a first device with audio content played by a second device, and to methods of processing video content for use in such methods or by such apparatuses. In particular, but not exclusively, the first device may be a public display screen and the second device may be a personal user device, such as a smartphone or smart wearable device. The invention may be of particular utility when there is no electronic communication pathway between the first and second devices.

According to a first aspect of the invention, there is provided a method of synchronising audio content arranged to be played by a second device with video content played by a first device, wherein the second device comprises a camera, the method comprising:

capturing at least a portion of the video content with the camera;
 performing image recognition on the captured video content to identify a visual feature within the video content, the visual feature corresponding to a set time point in the audio content; and
 commencing playing the audio content from a selected time point in the audio content corresponding to the set time point, such that the audio content is synchronous with the video content.

The identifying a visual feature may comprise, or form part of, identifying a key frame within the video content, the key frame corresponding to the set time point in the audio content. The performing image recognition may therefore comprise identifying a key frame within the video content based on the visual feature, the key frame corresponding to the set time point in the audio content.

The captured video content may include a first optically-readable code (e.g. a QR code). The identified visual feature may be or comprise the disappearance of the first optically-readable code.

The captured video content may include a second optically-readable code (e.g. a QR code). The identified visual feature may be or comprise the replacement of the first optically-readable code with the second optically-readable code.

According to a related aspect of the invention, there is provided a method of synchronising audio content arranged to be played by a second device with video content played by a first device, wherein the second device comprises a camera. The method comprises:

capturing at least a portion of the video content with the camera;
 performing image recognition on the captured video content to identify a key frame within the video content, the key frame corresponding to a set time point in the audio content; and
 commencing playing the audio content from a selected time point in the audio content corresponding to the set time point, such that the audio content is synchronous with the video content.

The key frame may be identified using one or more visual features. The performing image recognition may therefore comprise identifying the key frame within the video content based on a visual feature.

It will be appreciated that many different types of algorithms and approaches can be used for "image recognition"/"visual recognition"—ranging from the design approach taken to QR code recognition or barcode scanning, to use of a trained neural network to identify a specific imaged object or type of object, or other more general-purpose image recognition technologies. In different embodiments, different techniques or combinations of techniques may be used depending on the visual feature to be used for identifying the set time point. For example, any general-purpose image recognition technology may be used to identify a person or object whose image is present in a keyframe/whose image is a visual feature of interest, and/or a QR code recognition algorithm may be used to identify a QR code present in or superposed on a frame, for example a keyframe.

The method may be performed entirely by or at the second device. Alternatively, some of the processing may be performed elsewhere, e.g. at a remote server.

Various known displays provide a visual experience, but without audio. It is desirable to enable viewers to enjoy a corresponding audio feed, for example via a browser on their phone, using the screen (or other display) itself as a trigger to synchronise the audio as accurately as possible.

In addition, the video content may be visible a significant distance away from the screen of the first device (and/or away from the projection surface, where the first device is or comprises a projector). This presents two problems—firstly, playing the audio content at a high enough volume for distant viewers to hear it might create uncomfortably loud noise for nearer viewers, and, secondly, the time lag due to the speed of sound being a lot less than that of light might give a poor user experience for more distant viewers. Local and user-specific playing of audio content is therefore desirable, and advantageously provided on demand by various embodiments of the invention.

The set time point may be the start of display of the key frame or visual feature or the end of display of the key frame or visual feature.

The selected time point may be selected by adding a processing delay allowance to the set time point, for example to allow for the time elapsed between capturing the key frame or visual feature and commencing playing of the audio content, which may be due to a small but finite time needed for processing.

The audio content may be a single audio stream. The second device may download only a portion of the audio stream, for example from the selected time point forward.

The performing of image recognition on the captured video content may comprise identifying a plurality of visual features. The plurality of visual features may be used to identify a single key frame, or multiple key frames.

The performing of image recognition on the captured video content may comprise identifying a plurality of key frames. For example, the method may comprise identifying a pair of key frames with a known time interval between the two, and the commencing playing the audio content may not be performed until the second key frame of the pair has been identified. Advantageously, the use of two or more key frames to identify a set time-point may reduce the risk of a false-positive and subsequent incorrect synchronisation.

The image recognition may be performed by a plurality of trackers, each arranged to search for one particular key frame or visual feature. Multiple trackers may seek the same key frame or visual feature in some embodiments, to reduce the risk of a key frame or visual feature being missed. If one tracker identifies its key frame, any trackers searching for key frames which occur earlier in the video content than the identified key frame may be stopped, or may be assigned to a new key frame later in the video content.

Each tracker may sample frames of the captured video content at a sampling rate less than the frame rate of the video content as displayed—for example due to the camera of the second device not capturing every frame as displayed (limitation of the camera), and/or due to a tracker processing time being greater than a time between frames (limitation of processing speed). A plurality of trackers may be assigned to the same key frame, the trackers having offset sampling times; advantageously this may reduce the risk of missing a captured key frame.

A plurality of trackers may be assigned to different key frames which are close together in time relative to the length of the video content.

The performing image recognition on the captured video content may comprise detecting an image of an entity (any suitable visual feature) within a frame, and identifying the first frame in which that entity is no longer visible as a key frame. The entity may be, or may be a specified part of, an object or a logo designed to be seen by a viewer, or may be a marker designed to be picked up by computational image recognition (which may or may not be clearly visible to a user). The object, logo or marker may form an integral part of the video content. Alternatively, especially in embodiments in which the entity is a marker, the marker may be specifically added to the video content for use as a time marker, for example being superimposed on the video content at the time of display, or located in a displayed border surrounding the original video content, instead of being an integral part of the original video content. In such embodiments, the marker becomes a part of the video content when it is displayed, and is captured as a part of the captured video content.

The method may be performed for synchronising previously-recorded audio content with a display of previously-recorded video content. Frames of the video content suitable for use as key frames may therefore be identified in advance. Reference copies of the key frames may be provided to the second device for use in the image recognition process.

Optionally, a plurality of key frames may be identified in advance, and only a subset of these key frames may be sought in the step of performing image recognition. For example, the subset may be identified based on comparing a current time to an estimated start time of playing of the video content, or based on identification of an approximate section of video content, e.g. by recognising a particular logo or other entity present for a substantial period of time/a number of consecutive frames.

In some scenarios, the method may be performed for synchronising live or near-live audio and video content. In such cases, advance knowledge of an image due to be present in the video content may be used to trigger playing of the live or near-live audio.

According to a second aspect of the invention, there is provided a method of preparing video reference data for use in synchronising audio content arranged to be played by a second device with video content played by a first device, wherein the second device comprises a camera arranged to capture at least a portion of the video content played by the first device. The method comprises:
  reviewing the video content to identify frames within the video content suitable for use as key frames to be identified by image recognition, each key frame corresponding to a set time point in the audio and video content;
  generating a dataset of reference copies of key frames and corresponding time points of the key frames; and
  providing the generated dataset for use by the second device.

The reference copy of a key frame may be generated by applying one or more transformations to the identified key frame of the original video content.

Suitability of frames for use as key frames may depend on one or more visual features of those frames or adjacent frames.

Multiple different reference copies may be generated for each key frame. Each reference copy of the same key frame may be generated to facilitate image recognition of the key frame under different second device conditions and/or different environmental conditions. A plurality of datasets may therefore be generated and stored, or a large dataset may be generated from which a smaller dataset is extracted for provision to the second device.

The providing the generated dataset to the second device may comprise one or more of:
  (i) providing the relevant dataset based on device type of the second device;
  (ii) providing the relevant dataset based on local time and/or weather conditions of the second device;
  (iii) providing the relevant dataset based on geographical location and/or orientation of the second device; and
  (iv) providing the relevant dataset based on current time.

A dataset as described with respect to the second aspect may be used in the image recognition step of the method of the first aspect.

According to a third aspect of the invention, there is provided a computer-readable medium in which computer program instructions are stored, which instructions, when read by a computational device, cause the computational device to perform the steps of:
  capturing, using a camera, at least a portion of displayed video content;
  performing image recognition on the captured video content to identify a visual feature within the video content, the visual feature corresponding to a set time point in the audio content; and
  commencing playing the audio content from a selected time point in the audio content corresponding to the set time point, such that the audio content is synchronous with the video content.

The step of performing image recognition may comprise identifying a key frame within the video content, based on the/at least one visual feature, the key frame corresponding to the set time point in the audio content.

According to a related aspect of the invention, there is provided a computer-readable medium in which computer program instructions are stored. The computer-readable medium may be non-transitory. The instructions, when read by a computational device, cause the computational device to perform the steps of:
  capturing, using a camera, at least a portion of displayed video content;
  performing image recognition on the captured video content to identify a key frame within the video content, the key frame corresponding to a set time point in the audio content; and
  commencing playing the audio content from a selected time point in the audio content corresponding to the set time point, such that the audio content is synchronous with the video content.

The instructions may be arranged to cause the computational device to, prior to the capturing of the video content, prompt a user to orient the camera so as to capture at least a portion of the video content within a field of view of the camera.

The performing image recognition may comprise searching for the key frame in the captured video content based on a reference copy of the key frame provided in advance to the computational device.

The instructions may be arranged to cause the method of the first aspect to be performed.

A dataset as described with respect to the second aspect may be used in the image recognition step of the third aspect.

According to a fourth aspect of the invention, there is provided a device arranged to synchronise audio content with video content played by a different device and to play that audio content, wherein the device comprises:

a camera arranged, in use, to capture at least a portion of the video content within a field of view of the camera;

processing circuitry arranged to perform image recognition on the captured video content to identify a visual feature within the video content, the visual feature corresponding to a set time point in the audio content; and an audio output unit arranged to play the audio content from a selected time point in the audio content corresponding to the set time point, such that the audio content is synchronous with the video content.

The identifying the visual feature may comprise, or form a part of, identifying a key frame within the video content, the key frame corresponding to the set time point in the audio content. The device may be arranged to download the audio content, or a relevant portion thereof, in response to identifying the key frame.

According to a related aspect of the invention, there is provided a device arranged to synchronise audio content with video content played by a different device and to play that audio content. The device comprises:

a camera arranged, in use, to capture at least a portion of the video content within a field of view of the camera;

processing circuitry arranged to perform image recognition on the captured video content to identify a key frame within the video content, the key frame corresponding to a set time point in the audio content; and an audio output unit arranged to play the audio content from a selected time point in the audio content corresponding to the set time point, such that the audio content is synchronous with the video content.

The audio output unit arranged to play the audio content may be a speaker or headphones or similar, or may be an output port arranged to be connected to a speaker, headphones, or the like. The audio output unit is therefore arranged to cause or allow the audio content to be played, directly or indirectly.

The device may be arranged to fulfil the role of the second device in the method of the first aspect.

The video content may be pre-processed as described with respect to the second aspect, and a dataset as described in the second aspect may be provided to the device in advance.

The device may comprise memory storing a dataset of reference copies of key frames and corresponding time points of the key frames for use by the processing circuitry in performing the image recognition.

The device may be arranged to download the audio content, or a relevant portion thereof, in response to identifying the key frame, or earlier, e.g. in response to being sent a dataset of reference copies of one or more key frames and before a particular key frame is identified.

The device of the fourth aspect may comprise memory arranged to perform as the computer-readable medium of the third aspect.

The skilled person will appreciate that features discussed in relation to any one aspect of the invention may be provided with any other aspect of the invention, mutatis mutandis.

Embodiments of the invention will now be described in more detail by way of example only with reference to the accompanying drawings in which like reference numerals are used for like features:

FIG. 1 shows an example implementation of the apparatus of an embodiment;

FIG. 2 schematically illustrates the pre-processing of video content for use with various embodiments of the invention;

FIG. 3 schematically illustrates different pre-processing of video content for use with different devices;

FIG. 4 schematically illustrates a device of various embodiments, in communication with a server;

Figure 1:
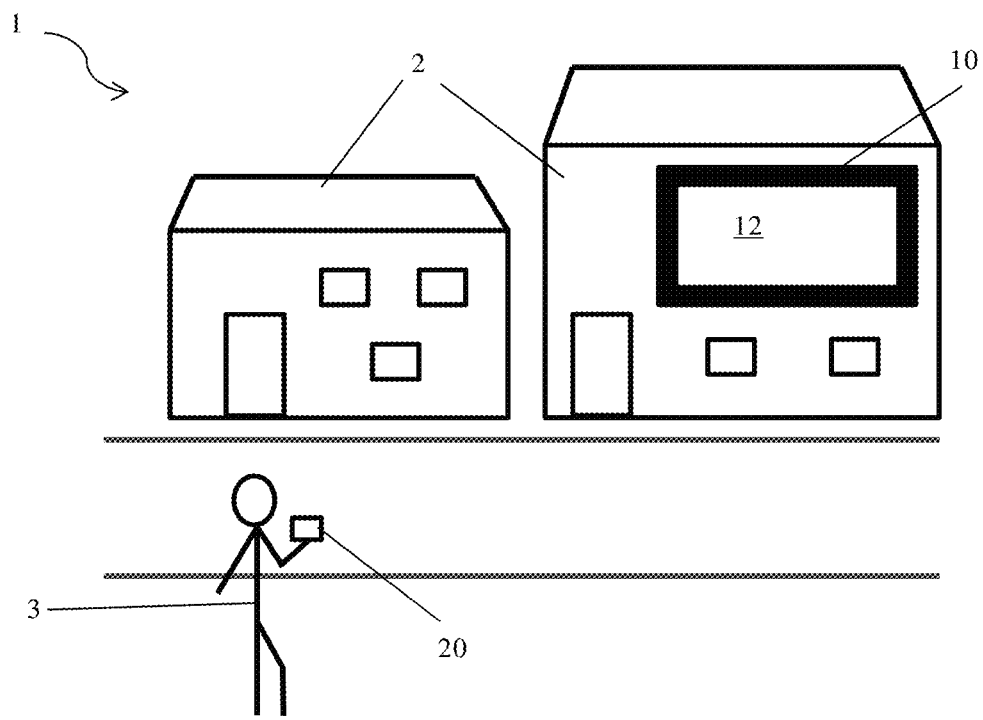

FIG. 1 shows an outdoor street scene 1, comprising buildings 2 adjacent a road, and a person 3. It will be appreciated that the environment 1 shown in FIG. 1 is provided by way of illustrative example only, and is in no way intended to be limiting. Embodiments of the invention may be implemented in both indoor and outdoor settings.

A device 10 is mounted on one of the buildings 2; the device 10 may be referred to as the first device 10. The first device 10 is arranged to display video content 12—i.e. visual content which changes with time. In the embodiment being described, the first device 10 is a display screen, such as an electronic billboard. In alternative embodiments, the first device may not be or comprise a screen, for example being a projector which projects video content onto a surface.

The video content is visible to the person 3. In the embodiment being described, the first device 10 is not arranged to play any audio content. It will be appreciated that, in various environments—such as outdoors, or in airport or hotel lounges or the like—it may not be desirable to play audio content corresponding to the displayed video content 12 as this might disturb people nearby. In addition, the video content 12 may be visible a significant distance away from the screen of the first device 10 (and/or away from the projection surface, where the first device 10 is or comprises a projector), making choosing a suitable volume for any audio content difficult.

If the person 3 wishes to hear the audio content, the person 3 (the user) may use a local device 20. The device 20 is referred to as the second device 20, and may be, for example, a personal device belonging to the user 3, e.g. a smartphone, smart watch, augmented reality glasses, or another wearable smart device, or similar, or may be a device provided locally for use, such as an entertainment terminal in a lounge environment.

The second device 20 comprises a camera 22. The camera 22 may be integral with the second device 20, or provided as a separate module connected thereto. The camera 22 may be any image-capturing device capable of recording video or taking multiple still images in quick succession at a short enough exposure time to capture video without significant blurring. Currently, common definitions of "smooth video" are 24 fps, 29.97 fps, and 30 fps, although it will be appreciated that as long as the frames per second rate of the capture device 20 is known, this could be compensated for in the processing.

The second device 20 is arranged to communicate with a server 30, in the embodiments being described, so as to obtain and synchronise the audio content.

The user 3 positions the second device 20 such that at least a portion of the video content 12 displayed by the first device 10 is visible within a field of view of the camera 22. At least a portion of the video content 12 displayed by the first device 10 can therefore be captured by the second device 20. In some embodiments, all of the spatial area of the displayed video content 12 may be captured. In other embodiments, for example when a user 3 is too close or the screen/other display, or the screen/display is too large, only a portion may be captured. The second device 20 may be arranged to provide a prompt to the user 3 to change the position of the second device 20, and/or the zoom level of the camera 22, if an insufficient amount of the video content 12, or the wrong area of the video content 12, is captured for the method described below to be performed. Similarly, the second device 20 may be arranged to provide a prompt to the user 3 to change the position of the second device 20, and/or the zoom level of the camera 22, if the whole of the display is captured, but too small/at too low a resolution for the method described below to be performed.

The video content 12 displayed by the first device 10 comprises a series of frames 12. Each frame may be thought of as a still image, although the skilled person would appreciate that technically, in most current video encoding schemes, most "frames" are composed of small updates from the previous frame, with whole frames appearing only in scene changes or at periods, to facilitate compression. Nonetheless, each frame appears as a still image when displayed, and can be captured by the second device 20 as a single, whole, image, which may again be referred to as a frame.

A frame rate of the video content 12 is generally set to be high enough to provide an impression of smooth movement to a viewer. At the time of writing, a frame rate of 24 frames per second (fps) is generally considered to be a sensible minimum frame rate for smooth motion (typical of movies; generally around 30 fps for TV, although current Apple® devices often request 60 fps). In various embodiments, a device/browser may choose a default frame rate to use to suit its own specification and capabilities. The video content 12 may therefore be played by a first device 10 at a first frame rate, and received by multiple second devices 20, potentially being captured by those second devices 20 at different frame rates.

Each frame 12 is displayed at a particular time (and potentially at multiple times, for a repeated display, e.g. looped video). The time of each frame may be described as a time point for that frame—time points are illustrated by T1 to T8 for the eight frames shown in FIG. 3—T1 may be t=0, for the start of the video content 12, with the time-point of each subsequent frame 12 being recorded as an interval, or delta, from t=0. In various embodiments, the time point may be defined with respect to a global time (e.g. server time), or with respect to an offset from the start (first frame) of the video content 12. In the embodiment being described, each frame has a time associated with it, the time being stored as a number of seconds from the beginning of the audio stream.

This may be presented and/or saved as a number of hours, minutes, and seconds. In the embodiment being described, the time point is recorded to a precision of three decimal places on the seconds—i.e. millisecond precision. Different levels of precision may be used in other embodiments. For sound effects, a margin of error of 100-250 ms might be acceptable, but for "lip sync" to speech to appear natural, this margin is much less. High precision identification of time points is therefore desirable in many embodiments, to allow high-accuracy synchronisation.

In the embodiment being described, some of the frames 12 of the video content are designated as key frames 14. "Key frames" 14 may be thought of as specific moments of time in the video content (e.g. footage) that are best suited to the various detection technologies available for image detection and recognition. Knowing where in the video content 12 these frames 14 appear, and therefore where in the corresponding audio content the associated sound will be, allows an exact point for where in the audio content to begin playing to be identified, so synchronising the video content 12 played by the first device 10 with audio content played by the second device 20.

In the embodiment being described, the video content 12 is pre-processed 600, 110, for use in the audio and video synchronisation method 500 described herein.

In the embodiment being described, frames of the video content 12 are selected for use as key frames 14 based on properties of the still image of the frame being suitable for accurate image detection. For example, a distinctive visual feature such as one or more corners of high contrast, or a distinctive shape, or a particular colour, or tone gradient, may be present in the frame 14.

Figure 2:
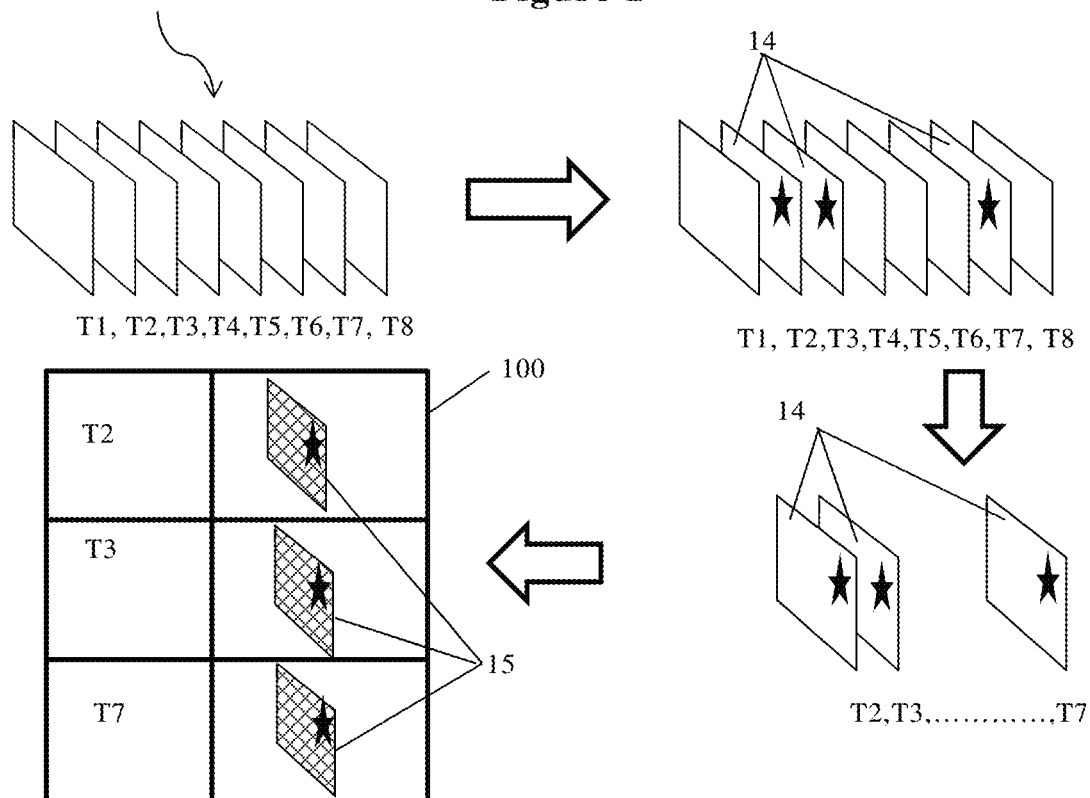

In the embodiment shown in FIG. 2, a black star is used to identify the frames selected as key frames 14. This black star is used as a visual identifier for the frames identified as key frames 14 for the purposes of this description only, and is not intended to imply that frames containing black stars which are relatively large compared to frame size are necessarily selected as key frames.

Figure 7:
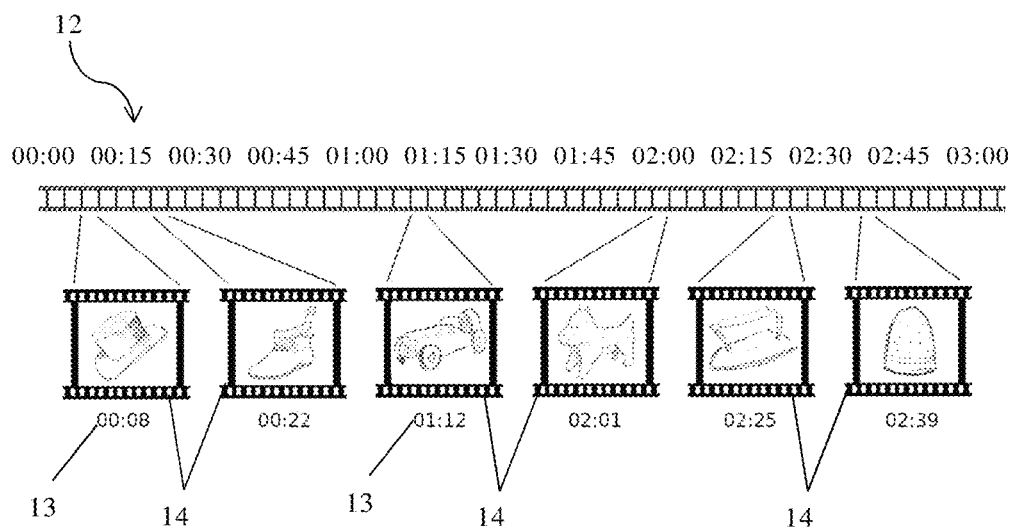
FIG. 7 illustrates key frames within a section of video footage.

FIG. 7 shows a more representative, less schematic, example, with a variety of key frames 14 shown extracted from a segment of video footage 12. As marked, the video content 12 has a time dimension, with individual frames being shown for specified durations (generally of around $\frac{1}{30}^{th}$ of a second, depending on frame rate). Each key frame 14 therefore has an associate time-point 13, which may be defined by the start of display of the frame, or the end of display of the frame, or a mid-point.

Again, it will be appreciated that the images shown on the selected key frames 14 are provided by way of example only, and are in no way intended to be limiting. FIG. 7 is provided to emphasise that the approach described herein looks at the video content 12 itself as obtainable by a separate camera 22, not e.g. associated metadata, and that each key frame 14 is, generally, unique (in some cases, a recurring frame may be used as a key frame 14, but in such cases identification of two or more key frames 14 may be required, or additional data needed, to uniquely identify a time-point 13).

Key frames 14 can be selected in a large number of different ways. Criteria to consider in the selection of optimal key frames for detection in the shortest time (given the typical frame rate of video and current image recognition technologies) may include one or more of the following, among others:

The presence of "corners"—image recognition algorithms can generally find hard edges in relation to one another relatively easily, so allowing the second device 20 not only to recognise the image, but potentially also to obtain a measure of scale and perspective/distortion from the point of view of the device camera 22.

Variations in "colour"—saturation and lightness are generally used as a substitute for colour, as many image recognition algorithms use black and white or greyscale values in their calculations.

Contrast—contrast may be affected by edges blurred by movement (e.g. movement of the camera 22 relative to the video display, and/or movement between frames during the capture time of the camera) and/or by artefacts introduced by common video compression techniques. Consideration of contrast and how this may vary between the key frames as shown by the first device 10 and the images captured by the second device 20 may therefore be helpful in identifying robust and easily-identifiable key frames 14.

A dataset 100 comprising reference copies 15 of key frames 14 and corresponding time points 13 of the key frames 14 may therefore be generated.

In the embodiment being described, one or more treatments, such as transformations, may be performed on the image of the key frame 14 so as to produce the reference copy 15. For example, the key frame image may be transformed to greyscale, saturation may be adjusted, and/or edges may be sharpened or softened. Transformations may be selected so as to better-match what is likely to be captured by a camera 22, and/or to emphasise the distinctive features intended to be identified by image recognition. In some embodiments, the reference copy 15 is a copy of the complete key frame 14. In other embodiments, the reference copy 15 may be a copy of only a part of the key frame 14, for example showing just the entity in the key frame to be identified/the visual feature of interest. In some embodiments, the reference copies 15 are provided as images. In other embodiments, the reference copies 15 may instead be provided as image descriptors for use in image recognition. In still further embodiments, the reference copies 15 may be identical to the key frames 14—no transformations or other modifications may be performed.

In various embodiments, one or more of the following treatments may be applied to copies of the key frames 14 to generate the reference copies 15 (it will be appreciated that, in many embodiments, the video content 12 for display cannot be edited, only the reference copies 15). These treatments may improve the detection success rate in a variety of different conditions:

Hardening and/or softening of edges;
Adjusting the colour—e.g. hue, saturation and brightness;
Scaling the image up and down, and resampling;
Creating variations in false perspective (in many use cases, users 3 may be looking up at a large screen from below);
Distortions to the images to account for the curvature of the screen, where applicable;
Cropping images to only the most prominent and compliant features.

In order to reliably determine a position in the timeline of the video content 12, so as to play synchronised audio, the movement of video footage presents additional issues beyond standard static image recognition difficulties:

Frames may not be visible for long enough to be reliably captured by the camera 22;
"Good" image targets (i.e. distinctive and easy to identify entities) might be shown statically for a period of time so on sight alone it is impossible to tell how long it was already visible before detection e.g. identifying a precise time point within a 5 second "still" or within a slowly-scanning scene may not be possible;
Overly simplistic image targets may appear multiple times in the footage (e.g. logos, common scenes); and/or
More complex "photo-real" scenes contain a lot of feature information which, as well as being slower to detect, can increase the rate of false positives elsewhere in the footage.

There may therefore be a trade-off between a desire for fast identification of a time point, and a desire to avoid false positives.

In various embodiments, one or more of the following approaches may be used:

In some embodiments, multiple frames close together in the video content 12 may all be identified as key frames 14—searching for several, temporally close, frames may increase the chances of finding one of the selection of key frames/capturing an image close enough to one of the reference key frames 15 to be successfully identified. The chance of missing a grouped subset of key frames 14 may therefore be less than that of missing a lone, single key frame 14, at the cost of more processing.

In some embodiments, the approach may require a plurality of key frames 14 to be identified before approving the identification of a time point (for example to reduce a risk of false positives). For example, relative frames may be sought; two key frames 14 with a known time between the two may be selected; these frames must then be detected in order, to increase confidence in the time point of the second image. This use of relative time may be of particular benefit when the visually-distinctive image components repeat, allowing a distinctive but recurring feature to be used whilst reducing or avoiding the risk of false positives.

In some embodiments, the key frame 14 is the first frame in a portion of footage in which a particular entity is no longer visible in the video content 12 (i.e. the key frame is the frame in which it disappears). This may be referred to as static frame compensation—when the footage shows a static image for a period of time, the second device 20 recognises that image and then waits until that image transitions away (to anything else). This approach avoids a need to know the precise time-point at which the entity is first detected—provided that the entity is detected at any point before it transitions away, the exact time-point of the transition can be identified. The first frame without the entity visible, or the last frame with the entity visible, may therefore be identified as the key frame 14, and the time-point of that key frame (which corresponds to the time-point of the transition) used to initiate playing of the audio content. It will be appreciated that this approach may have particular utility for static images or image portions (e.g. a static background image), but that it is not limited to this scenario—an identifiable entity may move around within the screen before vanishing, for example. The entity may be a part of the original video content—e.g. an object filmed within a room—or may be a marker added to the original video content when it is displayed, as described in more detail below.

In various embodiments, a plurality of differing datasets 100 may be generated from the same video content 12.

Figure 3:
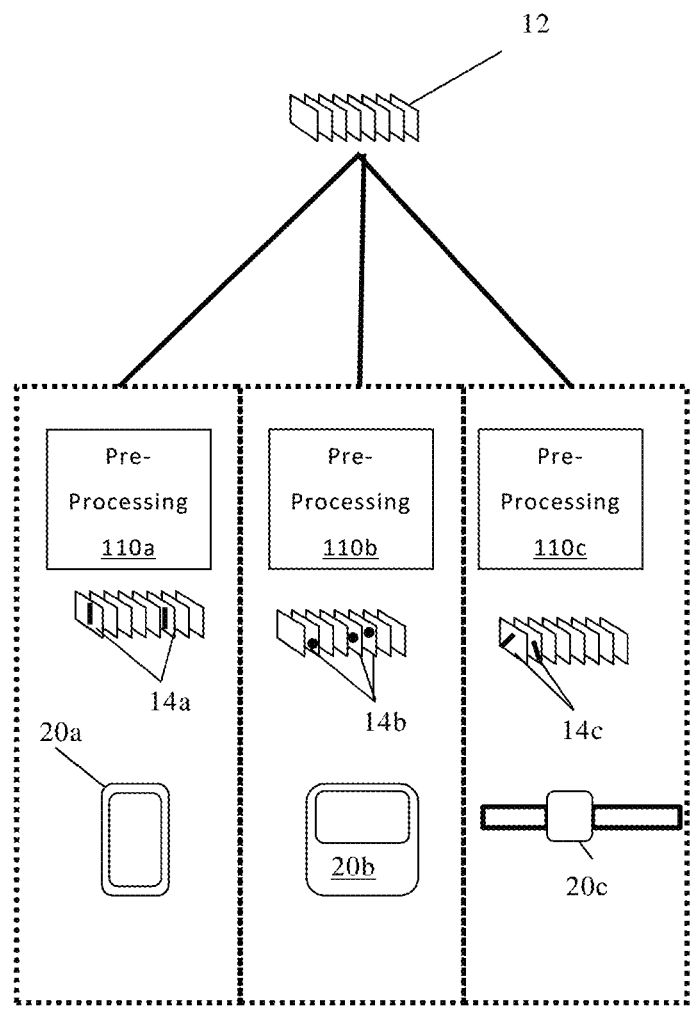
Figure 4:
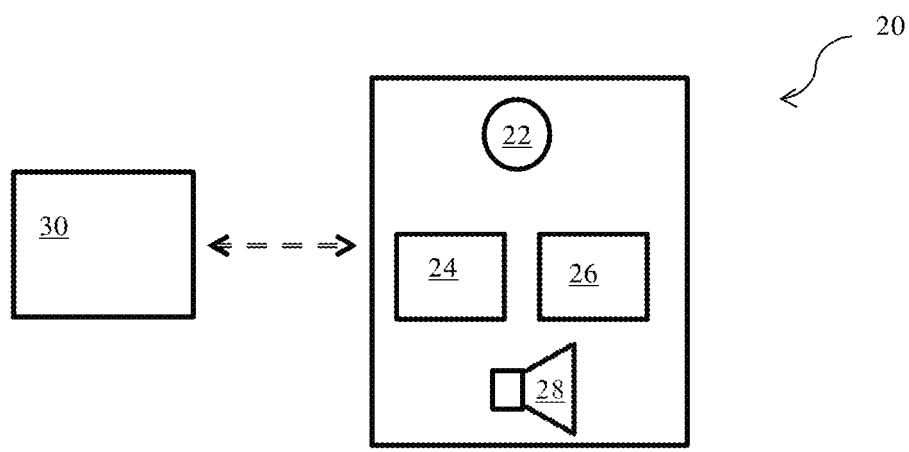

FIG. 3 illustrates the preparation of different datasets 100 from the same video content 12, for different second devices 20a, 20b, 20c. For example, the second devices 20 may be a smartphone 20a, a tablet 20b, and a wearable smart device such as a smartwatch 20c. Smart glasses/Augmented Reality (AR) glasses are another example of a smart wearable device which could be used as the second device 20.

In the embodiment being described with respect to FIG. 3, differing capabilities and properties of the various second devices 20 are taken into account when pre-processing the video content 12. For example, certain devices 20 may have more processing power and/or better cameras, so higher-resolution reference key frames 15 may be supplied to those devices to improve detection rates, and the approach may fall back to a lower-resolution for other devices (e.g. older, smaller, and/or cheaper devices). The processing performed on identified key frames 14 may therefore differ. Further, different frames of the video content 12 may be identified as key frames 14 in different datasets 100. For example, more key frames 14, with smaller intervals between them, may be selected for devices with higher processing powers, so reducing a maximum wait time. Alternatively or additionally, different cameras 22 may be more or less sensitive to different features, so a different selection of frames 12 may be selected as key frames 14 based on which features the relevant camera 22 of the selected device 20 is likely to be best able to detect. The different datasets 100 may therefore include different numbers of reference copies 15 of key frames 14, and the selected key frames may or may not overlap between datasets 100.

Different datasets 100 may therefore be provided based on device type of the second device 20, among other variables.

In additional or alternative embodiments, other factors may be used as a basis for generating datasets 100 and providing a most suitable dataset 100 to a second device 20. For example, local time and/or weather conditions may affect what the camera 22 captures; night-time may lead to more glare or reflections off a screen 10 (e.g. of streetlights or headlights), rain or fog may lead to blurring of the image, a particular angle of sunlight may cast dark shadows on the screen 10, and the like. Different reference copies 15 may therefore be prepared and provided based on current time and/or weather reports. By way of further example, different viewing positions may affect what is captured by the camera 22—e.g. due to a portion of a display being occluded from certain viewing positions, and/or due to varying perspectives on the full display. Different reference copies 15 may therefore be prepared and provided based on geographical location and/or orientation of the second device 20.

In some embodiments, two or more different reference copies 15 of the same key frame 14 may be provided in the same dataset 100. Searching for the key frame 14 based on each of two (or more) different reference copies 15 may increase the chance of key frame detection, for example with each of the reference copies 15 accounting for a different viewing angle, or different lighting conditions, or being based on a different spatial area of the video content 12 (for example to allow for partial occlusion of a screen).

In the embodiment being described, the second device 20 has access to at least a portion of a dataset 100, for example after downloading that dataset 100, or a portion thereof, from a server 30. The dataset 100 informs the second device 20 what to look out for to identify key frames 14. One or more of the methods outlined above may be used by the second device 20 to identify key frames 14. In particular, the second device 20 may comprise memory 24 arranged to store the dataset 100, and processing circuitry 26 (e.g. one or more processors) arranged to perform image recognition, seeking the key frames 14 identified by the dataset 100 in the captured video content. In other embodiments, the second device 20 may instead send the captured video content to a remote device or server for processing to identify key frames 14.

Various different technical implementations of the image recognition process to identify key frames 14 may be used in various embodiments.

In the embodiment being described, the second device 20 (and more specifically, processing circuitry 26 of the second device 20) is arranged to implement one or more "trackers". Each tracker is arranged to search for one particular key frame 14 (or one particular visual feature, in various embodiments). In some embodiments, multiple frames or visual features are sought concurrently, and multiple trackers are therefore run at a time. Running multiple trackers concurrently, each looking for the same key frame 14 or for temporally close key frames 14 may increase the chances of finding a frame or one of a selection of frames that are close together. As used herein "close" may mean close together in time relative to the length of the video content; for example all occurring within a particular 1%, 5% or 10% of the video length.

In the embodiment being described, in which the image processing is performed by the second device 20, and more specifically within a browser on the second device 20, processing of each captured frame may be performed on a browser "web worker". The skilled person would appreciate that web workers are a simple means for web content to run scripts in background threads; a web worker is generally JavaScript, and runs in the background, independently of other scripts, without affecting the performance of the webpage. The use of web workers therefore permits parallel execution since current browsers are single-threaded; without parallel execution, freezing of the displayed webpage until processing is complete would be likely. It will be appreciated that this example is provided simply as one possible implementation and that, especially as browser technology advances, different implementations may be used to obtain the desired processing result. Further, in some embodiments, the processing may be performed within a dedicated application instead of within a browser; the limitations on processing may be reduced in such embodiments.

In some embodiments, when one tracker identifies its key frame 14 or visual feature, all other trackers may be stopped. In other embodiments, such as embodiments in which identification of a plurality of key frames 14 at set intervals is needed to confirm a correct identification of a time-point, only any trackers searching for key frames which occur earlier in the video content 12 than the identified key frame are stopped. Alternatively, each tracker searching for key frames which occur earlier in the video content than the identified key frame may instead be assigned to a new key frame 14 later in the video content 2. The tracker which successfully identified its key frame 14 (or visual feature) may likewise be assigned to another, later, key frame (or visual feature). Alternatively or additionally, new trackers may be activated to look for later key frames 14, for example in embodiments in which different key frames 14 contain different types of features of interest, meaning that a different form of image recognition processing (and so potentially a different tracker) may be appropriate depending on the key frame sought.

Each tracker may sample frames at a certain sampling rate. In some cases, the sampling rate may be less than the frame rate of the video content 12, meaning that a single tracker could not capture every frame. In such scenarios, a plurality of trackers may be assigned to the same key frame 14, and the trackers may be arranged to have offset sampling times so that they sample interleaved frames. The chance of missing a key frame 14 may therefore be reduced.

It will be appreciated that, for many second devices 20—and in particular if the technique is implemented in a browser-based environment—processing resources may be limited. Therefore there may be practical limits on how many key frames 14 can be sought at once/how many trackers can be run simultaneously. With only image detection to determine the elapsed time in the video content 12 and with practical limits on the number of key frames 14 (or equivalently visual features) that can be searched for at once, the methods disclosed herein may work best for shorter, looped video footage (such as repeating ad segments)—for longer sequences, there may be an increase in the time gap between the points that can be recognised, due to key frames 14 being more spread out.

However, in some embodiments, other techniques may be used to narrow down a probable time window of the video content 12. For example, in some scenarios, a particular still frame/interstitial may be displayed for a period of time within a sequence, and/or or a detectable object may move around a scene over a period of time—instead of getting a precise fix from the known interstitial or moving object, that feature can instead be used to approximate a time-point within the footage, and therefore to inform the processing circuitry which frames are likely to come up next/to provide a selected list of key frames 14 or visual features for which to search accordingly. Alternatively, especially for shorter footage loops, identifying the feature may prompt display of a message about waiting for a restart of the loop for the audio to commence (e.g. "audio will commence at start of next repeat of this content").

In such embodiments, a dataset 100 may be selected and provided to the second device 20 based on the approximate time, and/or the trackers may be assigned to particular key frames 14 of the larger dataset 100 based on the approximate time. The time gap between key frames 14 may therefore be reduced for longer video content 12 even with a limited number of trackers. More information on one such implementation is provided in the "Identifying a Dataset" section below.

In various embodiments, particularly for browser-based embodiments, a practical limit may be a maximum of four or five key frames (or visual features) to be scanned for at any one time. The selected number of key frames 14 may therefore be 4 or 5 in such embodiments. It will be appreciated that a different selected (maximum) number may be set based on device capabilities. In other embodiments, the video content captured by the second device 20 may be sent elsewhere, e.g. to a server or cloud, for the image recognition processing—in such embodiments, processing power may be less limited and a much larger number of key frames 14 may be sought at any one time.

In a simple commercial application such as adding audio to a repeating advertisement displayed on outdoor media ("Out Of Home"), the short total runtime of the footage may offer one of two options in curating key frames:

1. To space the selected (maximum) number of key frames out over the total runtime of the footage at the most optimal points; or
2. To concentrate the selected number of key frames near the start to maximise the success of a match, since the wait time until a repeat is acceptable.

In either case, the number of key frames 14 is within the practical concurrency limit so all key frames 14 are sent to the second device 20 (i.e. the dataset 100 provided comprises all key frames of the video content), and all key frames are looked for at once. For example, for a 30 second loop of footage it might be decided to direct all processing towards detecting the beginning, since the viewer only needs to wait less than 30 seconds to restart. For a loop of 90 seconds, it might be decided to look for the beginning and a mid-way point, to break up the wait. For longer footage, a decision may be taken to space out the key frames 14 more evenly, or at the starts of specific scenes, for example—choices may be varied depending on the use case scenario.

For examples where the video content 12 is much longer, and particularly if it is not repeating, other information may be used to manage key frame monitoring.

When the video content 12 is longer, ordinarily there is a trade-off of longer gaps between the key frames 14 in the footage that can be recognised throughout, or else a concentration of improved detection near the start or at certain points at the cost of less or no determination in-between. If the video content 12 is due to be broadcast at a known time in advance, however, this time information can be used to assist the determination of a timeframe. As long as the known broadcast time is within a reasonably small margin of error, this knowledge allows for the selection of more key frames concentrated around a time-window calculated based on the current time and the expected broadcast start time to increase the chances of positive detection within a short time-frame. This approach may include:

Taking the current time from a reliable source;

Loading a dataset 100 for/Searching for a selected number of key frames 14 due to be displayed closest to this time—perhaps including some frames expected to be just before the current time in case of a broadcast delay, but most selected key frames 14 being due to be shown immediately or soon after the current time;

Stopping looking for some key frames 14 of that selected number when appropriate—as these frames have known timeframes for the audio but also come in a known relative order, as soon as one is identified, any key frames 14 understood to come before it can be disregarded;

Background load the next set of frames in the sequence (a subsequent dataset 100), and repeat the process until a positive time-point identification is established.

A number of key frames 14 much larger than the number to be sought at once can be identified over the total runtime of the video content 12; these may then be curated so as to provide a subset of key frames for which the second device 20 should currently search. A dataset 100 relating to only the selected subset may be provided to the device 20 in some embodiments.

In some embodiments, a known broadcast/display start time of the video content 12 may therefore be used to narrow down the selection of key frames 14. For example, a server arranged to provide the dataset 100 to the second device 20 may use the known broadcast time along with the current time to select the next n key frames in the sequence (where 'n' may be a number up to the selected maximum number of frames to be sought at once, e.g. 4 or 5 as discussed above). The current time used by the server may be the time at which the user 3 first opens a relevant web page, as described in the in the "Identifying a Dataset" section below.

As time elapses, when the "known time" (broadcast start time+offset) for a key frame 14 has passed, the second device 20 can request more frames from the server on a rolling basis until a match is found and synchronisation achieved. A new dataset 100 may be provided/the dataset 100 may be added to or replaced. It will be appreciated that the "known time" of the broadcast is approximate, and generally has an error margin greater than that acceptable for synchronisation. The known time can therefore be used to narrow down a time period in the video content 12 in which to look for a key frame 14, but generally is not in itself sufficient for synchronisation.

Once one or more key frames 14 have been identified, based on the reference copies 15 provided, a relevant time point in the audio content can be identified. This allows the audio content to be synchronised with the video content 12 before the second device 20 starts to play the audio content.

It will be appreciated that a time delay is likely to be present between the capturing of the image which is then identified as a key frame 14/in which a visual feature is identified and commencing playing of the audio content. The time delay may reflect the time needed for the image recognition processing to be performed and/or for the audio content to be retrieved. The audio content may be downloaded to the device 20 in response to the identification of the set time point of the identified key frame 14 and/or visual feature, or may be downloaded earlier and retrieved from local storage 24. In the embodiment being described, the audio content is streamed.

The second device 20 therefore commences playing the audio content from a selected time point in the audio content corresponding to the set time point 13 of the key frame 14 or visual feature, such that the audio content is synchronous with the video content 12. The selected time point is generally later in the timeframe of the audio and video content than the set time point, to an extent dependent on system capabilities so as to allow for the processing delay. The second device 20 comprises an audio output unit 28—this audio output unit 28 may be or comprise an integral speaker 28 of the device 20, or an output port arranged to have a speaker, headphones, or similar connected thereto. Some second devices 20 may have multiple audio output units 28, which may be selectable by the user 3.

In the embodiments being described, the audio content is provided in a streamable state. The 'seeking' of the correct time-point in the audio content may therefore be handled by existing standards, as would be understood by one skilled in the art. For example, for current browser-based implementations of the embodiments disclosed herein, any suitable standard(s) to which HTML5-compliant browsers all conform may be selected and used.

No special pre-processing of the audio content is therefore needed, in most embodiments. In some embodiments, the audio content may be sub-divided into smaller clips, for example for ease of download or speed of time-point identification; this may be done with minor and standard adjustments to audio content metadata, for example, to indicate which clip is required as well as how far in to that clip to begin playback. Standard techniques known in the art may therefore be used to process the audio content.

Figure 5:
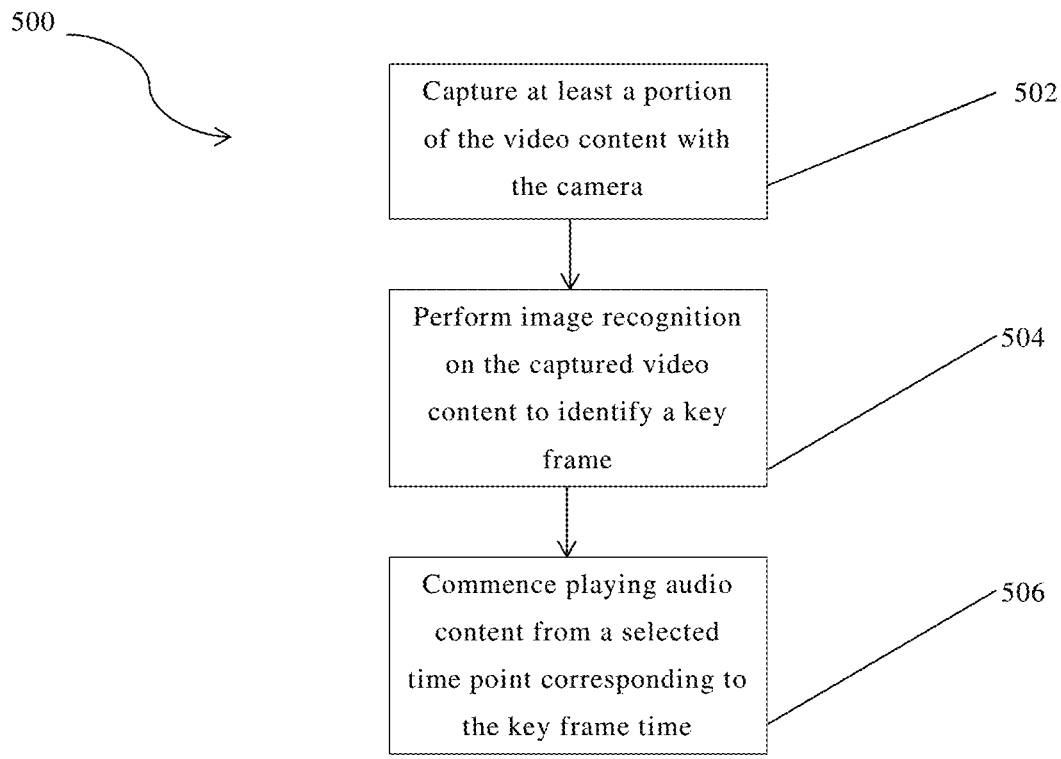
FIG. 5 illustrates a method of synchronising audio and video content in line with various embodiments of the invention.

A method 500 of synchronising audio content arranged to be played by a second device 20 with video content 12 played by a first device 10 is now described with respect to FIG. 5. The second device 20 comprises a camera 22. The method 500 may comprise orienting the camera 22 of the second device 20 so as to capture at least a portion of the video content 12 within a field of view of the camera 22. This step may be performed by a user 3 moving the second device 20 appropriately, optionally prompted by notifications provided by the second device 20. In some embodiments, the second device 20 may provide notifications such as, "Please zoom in to ensure that the video to be scanned takes up at least 50% of your screen", or "Please ensure that the edges of the video to be scanned fall within the visible image on-screen".

The method 500 then comprises capturing at least a portion of the video content 12 with the camera 22, such that the second device 20 obtains a version of the at least a portion of the video content 12 displayed by the first device 10. In some embodiments, it may not be necessary for the whole of the screen 10 or other display surface to fall within the field of view of the camera 22—part of the video content 12 may be occluded (e.g. by vehicles or other people), or the video content 12 may be too close or too large to fit fully within the field of view of the camera 22. Image recognition may be performed successfully without the whole area of the frames 12 being captured in some embodiments.

In various embodiments, a user 3 keeps filming the video content 12 until one or more key frames 14 are identified, such that a successful identification of a time-point can be made. The second device 20 may provide a notification when the time-point has been identified, so a user 3 knows that capturing the video content 12 is no longer needed. The portion of the video content 12 captured is therefore generally only a fraction of the duration of the video content 12, whether or not the whole of each captured frame 12 is captured.

Image recognition is performed 504 on the captured video content 12 to identify a key frame 14 (and/or visual feature) within the video content 12. In the embodiments being described, the image recognition 504 is performed in real-time, as the video content 12 is being captured. For example, for video content 12 captured at a frame rate of 30 fps, processing of a single frame—to see if it matches the target image (i.e. to see if it is a key frame 14/to see if it includes a visual feature of interest)—is intended to be complete within $\frac{1}{30}$th of a second. It will be appreciated that different frames or visual features may be harder or easier to identify, and that processing times may therefore vary between frames, even on the same second device 20.

If processing of a single frame takes more than $\frac{1}{30}$th of a second, parallel execution (e.g. provided within a browser by web workers as described above) may allow the camera 22 to keep rendering the video content 12 uninterrupted, however subsequent frames may be ignored ("dropped") (at least by the relevant tracker, if trackers as described above are used) until the processing of the current frame is finished. The following process may therefore be implemented:

1. Software processes frame x;
2. Frames x+1, x+2, . . . x+n are dropped whilst processing of frame x is ongoing;
3. Software finishes processing frame x;
4. Software commences processing of frame x+n+1 (the latest frame to be captured at the time of completion of processing of frame x/the current live frame).

If a given combination of key frame 14 and footage 12 is sufficiently complex/if processing takes long enough that a subsequent frame or frames are dropped, this might introduce a delay in the audio synchronisation; when the key frame 14 is successfully identified, the audio content can be synchronised to the time of frame x, which may now be two or more frames "old". A time adjustment may therefore be factored in; for example counting the number of dropped frames and adjusting the audio stream accordingly so that it is correctly synced to the current live frame, rather than starting play from the time-point of frame x. Alternatively, in some embodiments, the subsequent frames may be stored for later processing rather than dropped, optionally with a time delay recorded for the sake of adjusting synchronisation to reflect the frames not being live.

It will be appreciated that tracking for more than one image at a time (for example to look for two closely-spaced key frames, or to look for the same key frame with different treatments, i.e. different reference frames 15) may exacerbate this effect, especially if processing power is limited.

Step 504 is therefore generally performed whilst step 502 is ongoing. A user 3 may be prompted to terminate the capturing step 502 once the image recognition process 504 has identified a time point 13 with an acceptable degree of certainty.

The key frame 14 corresponds to a set time point 13 in the video content 12, and therefore also to that same set time point in the corresponding audio content. In some embodiments, identification of a single key frame 14 may be deemed sufficient (an acceptable degree of certainty), and steps 502 and 504 may be terminated as soon as that single key frame 14 is identified. In other embodiments, for example to reduce the chance of false positives leading to incorrect synchronisation, two or more different key frames 14 with a known time interval between them must be identified before a time point is deemed to be identified with an acceptable degree of certainty. As each key frame 14 has an associated time-point, the identification of any two key frames 14 out of a set of sought key frames may be deemed sufficient in such embodiments, provided that the time interval between the captured frames matches the known time interval calculated from the time points of the two key frames 14. Three or more matches with matching intervals may be required in some embodiments.

Once a key frame 14, and hence a set time-point, has been identified, the method 500 comprises the second device 20 commencing playing of the audio content from a selected time-point in the audio content. The selected time-point is selected based on the set time-point, such that the audio content is synchronous with the video content 12. The selected time-point may therefore be described as corresponding to the set time-point of the key frame 14. In some embodiments, the set time-point may be the same as the selected time-point, however it will be appreciated that an allowance for processing delays is likely to be needed, meaning that the selected time-point is generally slightly after the identified set time-point (for example, adding a pre-calculated increment to the set time-point).

The method 500 may be implemented in software, for example provided in the form of a computer application or as part of a webpage. Computer-readable instructions arranged to prompt a second device 20 to implement the described method 500 may therefore be provided.

Figure 6:
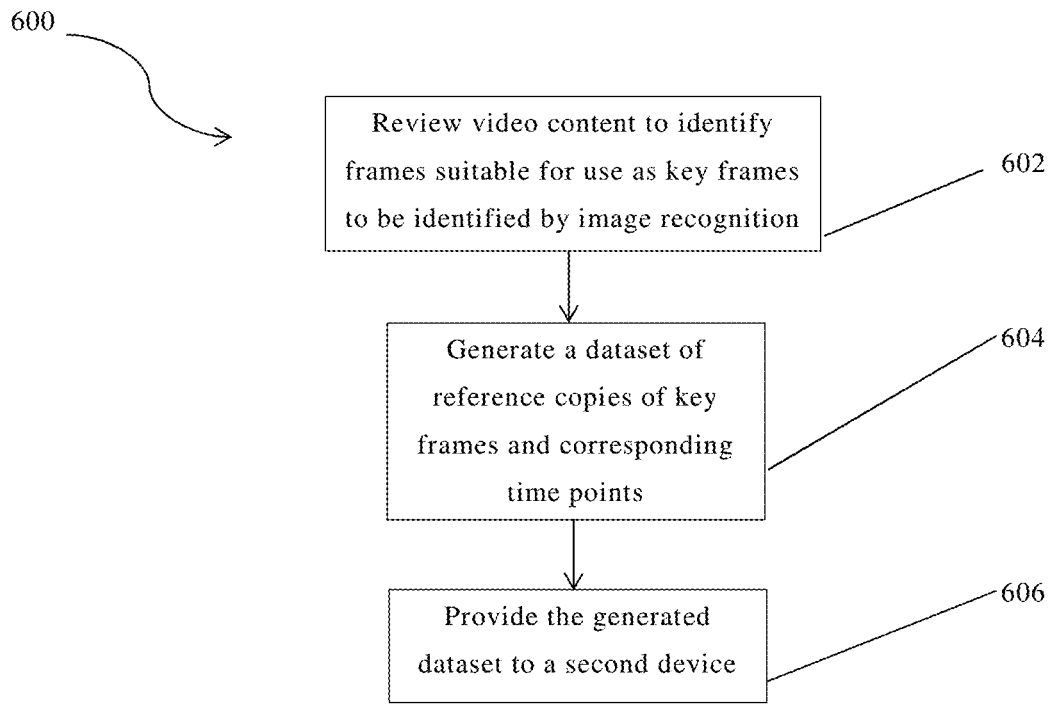
FIG. 6 illustrates a method of pre-processing video content in line with various embodiments of the invention.

A method 600 of preparing video reference data 100 for use in synchronising audio content arranged to be played by a second device 20 with video content 12 played by a first device 10 is described with reference to FIG. 6. The second device 20 comprises a camera 22 arranged to capture at least a portion of the video content played by the first device 10, and an audio output unit 28 arranged to play the audio content.

The method 600 comprises reviewing 602 the video content 12 to identify frames within the video content 12 suitable for use as key frames 14; i.e. frames identified as being well-suited for identification by image recognition. This review may be performed manually, and/or automatically, e.g. using machine learning techniques based on examples of suitable key frames from other video content 12, or using rules for computer image recognition, or the specification of one or more visual features to be used. Each key frame 14 corresponds to a set time-point 13 in the audio and video content.

The method comprises generating 604 a dataset 100 of reference copies 15 of key frames 14 and corresponding time points 13 of the key frames. Generating the reference copies 15 may comprise performing one or more transformations on the key frames 14, and/or extracting particular parts or features from the key frames 14.

Optionally, multiple datasets 100 may be produced. Each dataset 100 may be based on a different selection of key frames 14, and/or may comprise differing reference copies 15 of the same original key frames 14. As described above, different datasets 100 may be more appropriate to different second devices 20 and/or different environmental conditions. Multiple different forms of pre-processing 110a, 110b, 110c may therefore be performed on the same video content 12, as illustrated in FIG. 3, so as to generate 604 multiple different datasets 100.

Finally, the generated dataset 100 is provided 606 for use by a second device 20, for example by being uploaded to a server 30 such that the second device 20 can obtain it via a website.

Identifying a Dataset

In order to provide a suitable dataset 100 to a second device 20, knowledge of what video content 12 the second device 20 is viewing is needed. This may be implemented in a wide variety of ways, ranging from automatic location-based identification to user entry or selection of a first device 10. Given access to second device location (either automatically from the device 20 or by a user 3 specifying a location, for example) a single "experience" (combination of audio and video content) may be identified, that being the only experience available in the particular location. More precise position and orientation information of the second device 20 may be used to make a selection between experiences if there are multiple first devices 10 within the identified geographical area. Alternatively, a user 3 may choose an experience from a collection—a web-based portal may present a list of experiences to the user 3 in some such embodiments.

To provide context for a way in which the audio synchronisation techniques described herein may be consumed in practice, there follow some notes on an example user experience. At the time of writing, the market strongly favours web-based Augmented Reality (AR) for its accessibility, or "lack of friction"—web-based AR requires only a link or the scanning of a QR code (or similar, e.g. another kind of optical code) to access the experience, in contrast to having to download a specific application. Although other options exist, in the embodiment described below it is assumed that the content provider (e.g. an advertiser) has taken steps to draw the user's attention to a website corresponding to the video content 12, e.g. by provision of a visible URL or code, such as a scannable QR code. The URL or code may be displayed as part of the video content 12 in some embodiments, or nearby. For example, in the case of The Piccadilly Lights (a large outdoor electronic display screen in London) there are often up to six advertisers running video content concurrently; each might have their own campaign, and it would be their responsibility to draw attention to it by whatever means. Nonetheless, a general landing page may also be made available for The Piccadilly Lights (or any other first device 10, correspondingly) which lists all the currently available experiences in a menu. A link or scannable code, such as a QR code, can therefore encode which experience the user 3 should expect, requiring no further selection. The user can simply type or click the link, or scan a code, so as to inform a server which video content 12 is being observed, and therefore which dataset(s) 100 should be provided. An embodiment using a link or code is described in more detail below; it will be appreciated that similar approaches may be taken following a different identification process.

Figure 8:
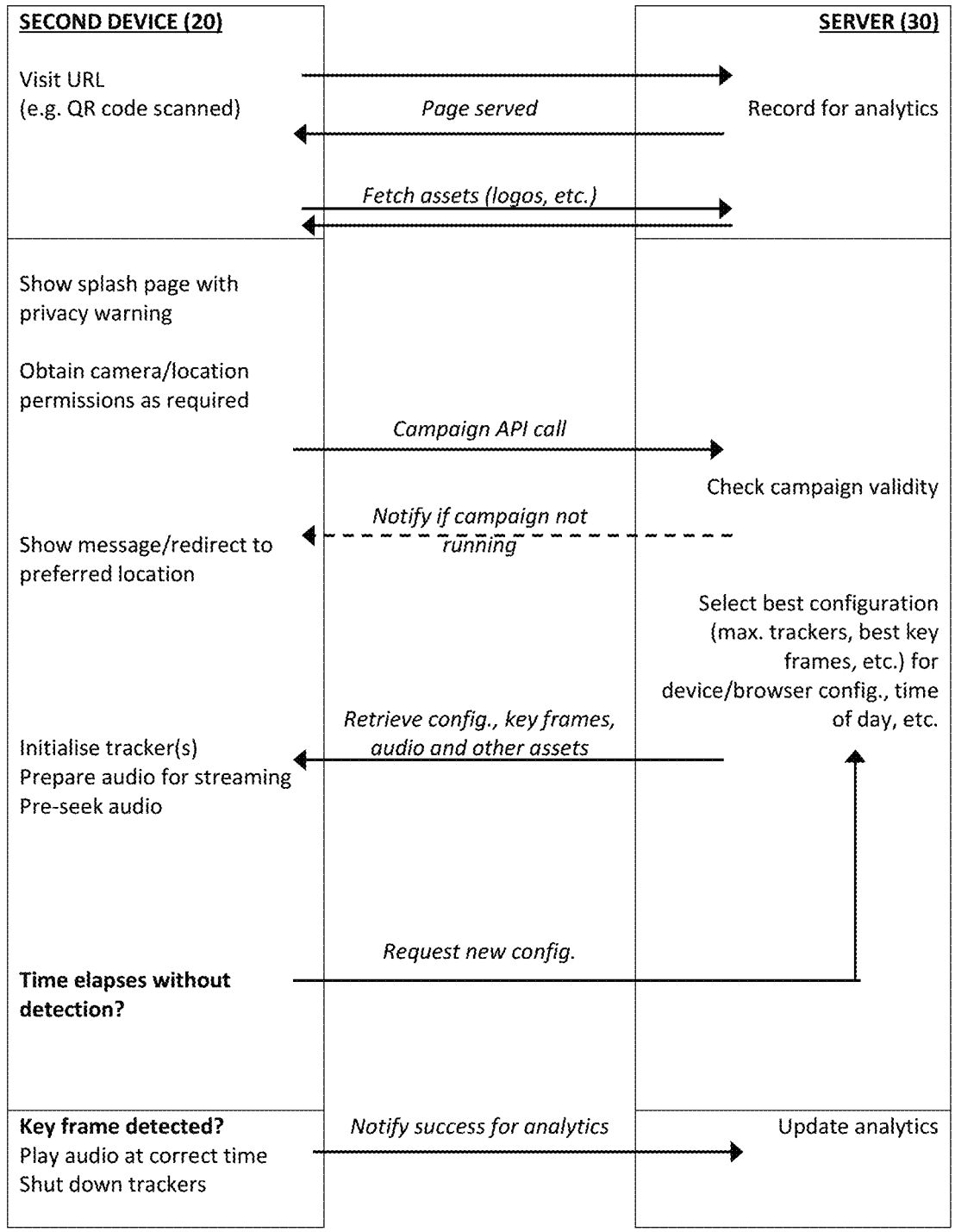
FIG. 8 illustrates a work-flow corresponding to the method of FIG. 5.

In the embodiments being described, using the link or code provided (e.g. entering a URL or scanning a QR code displayed on or near the screen 10 or other display surface) causes the second device 20 to load and display a webpage hosted on a server 30. As illustrated in FIG. 8, use of the link or code may cause a splash page, optionally with a privacy warning, to be displayed, and/or may prompt a user to grant permissions for the device camera, location, and/or other information or features.

On loading the page, the second device 20 is prompted to make some initial calls to an application programming interface (API). These calls may allow the initial visit to the webpage to be recorded, and some information (e.g. one or more of device type, operating system, browser, device location, etc.) to be recorded for analytics purposes and/or for tailored provision of a dataset 100. Some licensing checks may also be performed, for example allowing validity of the campaign to be verified (e.g. refusing to provide audio content if the video content provider has only paid for a certain, expired, duration of use of the service, and optionally providing a notification that audio content is no longer available in that scenario). The start of the workflow may therefore include a call to an API to check that a particular campaign is running. That exchange may additionally be used to determine or supply configuration information based on the reported nature of the device 20, e.g. to indicate among other things how many trackers the particular chosen combination of device and browser is likely to be able to manage/how many key frames 14 can be searched for concurrently.

Assuming that the checks are successful, in an audio synchronisation implementation the server now knows what campaign/"experience" the user 3 is expecting. Additionally, in some embodiments, given the known current time (i.e. the "server" time), the server 30 may be able to determine, at least approximately, which footage and section of audio is upcoming (for example by comparing current server time to a known broadcast start time of the video content 12).

The server 30 stores a database of reference copies 15 of key frames 14, created in advance, which includes a time-stamp/time point for each key frame 14. The time point indicates how far into the video content 12 the key frame 14 appears—the "offset"—generally with a precision of milliseconds.

Depending on the length of the video content 12 (e.g. a broadcast), all key frames may be selected, or just the most appropriate key frames may be selected (e.g. those expected to be upcoming in light of the broadcast time and current server time). The selected frames are then returned to the second device 20, along with information on the audio stream corresponding to the video content 12. The dataset 100 provided to the second device 20 may, more specifically, include reference copies 15 of the selected key frames 14 and the associated time points 13.

The server 30 may provide some or all of the audio content to the second device 20 at the same time as providing the dataset 100, allowing the second device 20 to prepare for playing the audio content before a particular start point for the playback is identified.

If an elapsed play time of the video content 12 exceeds a set period without successful key frame detection, a request may be sent to the server 30 for a new set of key frames 14.

In embodiments in which the audio is streamable, the whole file/a file storing the entire audio content may be stored on a server (which may or may not be the same server 30 as that providing key frames 14). That server can be asked for the audio data anywhere in the file, so it may not be necessary for the second device 20 to download all of the audio content.

The second device 20 may therefore be arranged to "pre-seek" the audio content before a selected time-point is identified for synchronisation, for example by preparing controls (e.g. provided by the browser) for the desired time (in this case the time of the first/next key frame 14 provided by the server 30, which may or may not be the first key frame of the video content); this may request audio data from the desired time onwards from the server, and the second device 20 may start fetching this audio data, caching it. Caching some or all of the audio data before a key frame 14 is identified may remove a potential delay that would otherwise need compensating for.

Once one or more key frames 14 have been identified, so identifying a time-point 13 in the video content 12, the second device 20 can then start playing the identified audio content from the identified time-point 13. In some embodiments, the audio content is an audio stream. In some embodiments, especially suited to relatively short video content 12, all of the corresponding audio content may be downloaded to the second device 20 (optionally as soon as the video content 12 is identified, and before the key frames 14 are found), and the second device 20 may then start to play the locally-stored audio content from the selected time-point, once a key frame 14 is identified. In some embodiments, the audio content may instead be directly streamed from the server 30 for playback instead of being locally stored in advance.

One or more trackers, or other processes searching for the key frames 14, may be shut down as soon as a successful time-point identification is made. In some embodiments, the second device 20 may report to the server 30 that synchronisation was successful, e.g. for feedback or analytics purposes. Similarly, the second device 20 may provide a report if synchronisation is unsuccessful, e.g. with a user 3 putting away the device 20 or leaving the area before audio synchronisation was achieved.

Once a successful time-point identification is made, the camera 22 of the second device 20 may also be closed/shut down, as obtaining further video is unnecessary for synchronisation. In some embodiments, the camera 22 may be shut down automatically; in other embodiments, a prompt may instead be provided to a user 3, suggesting shutting down the camera 22. It will be appreciated that shutting down the camera 22 when no longer necessary may provide practical benefits such as increasing battery life, and/or reducing processing load on the second device 20.

It will be appreciated that FIG. 8 is not exhaustive in terms of every decision, flow of control, or network call that may be made in various embodiments, but is provided as an example of the overall general dialogue between second device 20 and server 30, and where various decisions may be made.

Application to "Live" Video Streams

In some scenarios, live (or near-live) video content 12 may be displayed by a first device 10—e.g. a large outdoor screen or a silent television in a bar displaying a live sporting event. It will be appreciated that "live" broadcasts almost always have some kind of delay: a delay which could be just a handful of seconds, or even a fraction of a second, but which provides a sliding window inside which to move to synchronise audio content according to network time delays.

As live footage 12 cannot be pre-processed to identify key frames 14 as can be done for pre-recorded video content 12, cues or prompts may be used to allow key frames 14 to be identified, for example by superimposing visual markers on the video content 12 as it is displayed. For example, a sequence of n distinct, different, markers may be superimposed in turn on consecutive frames (or on consecutive pairs or groups of frames, if the allowable margin for audio synchronisation is greater than the display time of a single frame). In some embodiments, the value of n may be selected to be greater than or equal to the total number of frames expected, such that identifying the marker immediately identifies a unique offset from the start of the live broadcast. In other embodiments, the value of n may be selected to be greater than or equal to the total number of frames within the "sliding window" of the likely delay, such that a time point within that sliding window can be identified uniquely. The sequence of n markers may then be repeated, for example in the same order, as time passes. Visual markers such as those developed by Zappar Limited may be used in such embodiments. In either scenario, or in equivalent scenarios, identifying the marker allows a time point in the audio content to be identified, so that the audio and video can be synchronised. Advance knowledge of the marker type and sequence can be provided to the second device 20 as the dataset 100—the "reference copy" 15 of the key frame of the video content 12 comprising just the marker. It will be appreciated that some advance knowledge of the live video content (e.g. standard screen layout and sponsor logo locations for regular sporting events) may be used in designing and placing a suitable marker, so as not to either obscure video content or render detection of the marker more difficult due to background features.

Figure 9:
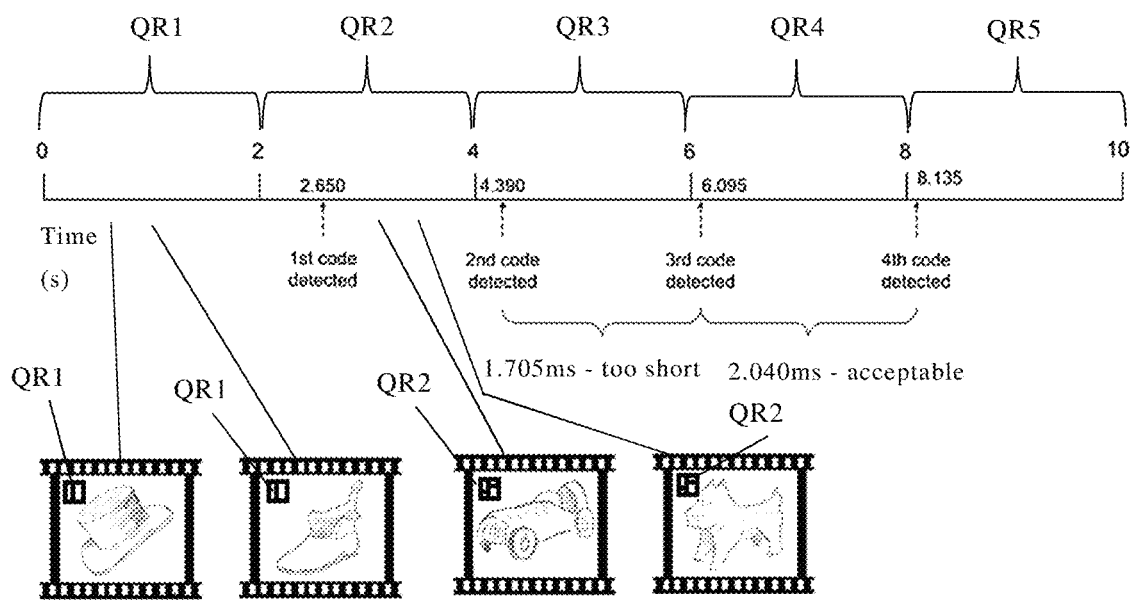
FIG. 9 illustrates the use of regularly-updating QR codes as markers in video content.

In some embodiments, the markers used may be QR codes (Quick Response codes) QR1, QR2 as shown in FIG. 9. The QR codes may be updated/replaced at set time intervals— e.g. precisely once every two seconds. QR codes may be identified and read in the captured video content using standard processing techniques; a time interval within the video content (e.g. a two second period, for video content with a QR code refresh rate of once every two seconds) may therefore be uniquely determined straight away, allowing for the subsequent audio to be identified and downloaded ready for playing in some embodiments. A precise moment in time for audio synchronisation may be determined by "watching" for when the QR code changes, and a user may be prompted to keep the camera directed at the display of the first device 10 until this occurs. The change in QR code allows a precise moment in time in the video content to be identified, and the corresponding audio content can then be played from the matching time point. The change in QR code may therefore be the identified visual feature—this visual feature may be thought of as identifying the frame on either side of the change as a key frame 14, or the change may be directly linked to a set time point in its own right.

The QR codes may therefore be thought of as providing a timecode. The QR codes change over time, at (usually regular) intervals over the duration of the footage.

The first frame of the captured video content 12 with the new QR code may therefore be identified as the key frame 14. Alternatively, the last frame with the previous QR code visible may be identified as the key frame 14, and the time-point of that key frame (which corresponds to the time-point of the transition) used to initiate playing of the audio content. Alternatively, this may be thought of as the time-point of the change-over between the frames being identified as the time-point to use for synchronisation, and neither frame being classed as a key frame—it will be appreciated that this is equivalent to taking the end-time of display of the first "key frame" or the start-time of display of the next "key frame" as the set time-point. In any case, a change in the visual display detected in the captured video content 12 is used for audio synchronisation.

Different QR code update rates may be used for different media, depending on an appropriate wait time for synchronisation of audio. It will be appreciated that QR codes are described by way of example only, and that different visually-readable codes or markers could be used in alternative or additional embodiments.

Use of a QR code, and hence of a QR code recognition algorithm, in identifying a set time point may be beneficial because of the ubiquity, speed and reliability of such algorithms. In addition, using added markers, such as QR codes, instead of searching for a feature in the original footage may allow the visual feature to be placed exactly where it is most useful—for example, aligned to specific timepoints or at fixed intervals as best suits the footage.

In some embodiments, the QR codes are arranged to change only slightly between consecutive QR codes (i.e. consecutive QR codes may be chosen to be similar), such that the changing QR code does not draw a viewer's attention. The QR codes may change in a smooth, moving pattern—e.g. with a "ripple" of changing pixel colours moving from left to right—to minimise distraction from the video content of interest to a user.

Scanning the QR code therefore allows the audio synchronisation to be performed using a technique familiar to users, and may also cause a website to be loaded, or other action to be taken, by the second device 20 (for example as described above). In some embodiments, all QR codes may link to the same website and/or perform the same action. In other embodiments, different QR codes in the sequence may link to different websites and/or perform different actions, depending on the part of the video content.

QR codes can therefore serve a dual-purpose as a call-to-action: containing the URL of a web app as well as providing a changing timecode. In various implementations, the schema for the timecode may use either the "query" or "fragment" parts of the URI as per RFC 3986 (specification for URI syntax) so that all the QR codes in a sequence will lead a user to visit the same address when scanned by the second device camera.

In embodiments using markers such as QR codes, the portion of the video content 12 required to be captured with the camera to allow identification and synchronisation may be relatively small—capturing the displayed QR code may be sufficient.

The QR codes are associated with particular time points in the video content to be displayed, and therefore with particular key frames 14. Generally, the refresh rate of the QR codes is lower than the frame rate of the video content, so the same QR code is present on multiple frames. The key frame 14 with which a QR code is associated may therefore be defined as the first or last frame on which that QR code is visible. In some embodiments, however, a static image may be displayed for a longer period of time, and the QR code refresh rate may be higher than that for the rest of the video content 12. An effective frame rate of the video content 12 as displayed and as captured may therefore be defined by the QR code refresh rate. In alternative or additional embodiments, the QR code refresh rate may be offset from the frame rate of the rest of the video content 12, such that an effective frame rate may not be a constant. In any case, identifying the visual change or other visual feature in the image which triggers the audio synchronisation can be thought of as identifying a key frame 14/a set time point in the video content 12, so allowing a corresponding set time point in the audio content to be identified.

When a particular QR code is first detected, the system (i.e. the second device 20 and any remote processing means used to process the data gathered by the second device 20) may have no knowledge of for how long that feature has been visible. Waiting for the disappearance of that QR code (e.g. when replaced by another QR code) allows a change in state associated with a particular timepoint to be identified. In some embodiments, a further check may then be performed—for example waiting for one or more further changes in state (e.g. a third QR code taking the place of the second). In some embodiments, the system may "wait" until two state changes/visual features spaced in time as expected are found. The "expected" spacing may be determined from prior knowledge of the footage, and/or may be encoded into a QR code or other marker. This approach may be particularly beneficial in embodiments in which markers (such as QR codes) are expected to change or appear at fixed intervals. This additional check may assist the system in adjusting for the delay between QR codes changing, the camera focusing, and/or the frame being made available for processing.

An example of this approach is shown in FIG. 9. In the embodiment shown in FIG. 9, the QR code QR1, QR2 is arranged to change at regular time intervals; more precisely, every two seconds measured from the start of the video content (t=0) in this embodiment. The first QR code, QR1, is present in the video content from t=0.000 s to t=2.000 s. In the embodiment shown, QR1 is detected/identified at t=2.650 s. At this point, there is no way of telling for how long QR1 has been visible (e.g. because a camera of the second device 20 has only just been turned on), nor indeed whether or not QR1 is still visible (as the processing needed to identify the QR code can take some time). Identifying QR1 can therefore be thought of as starting to "pay attention" to the markers, and the identification of QR1 may not be used in identifying the set time point, but instead simply in initialising the process—it may then be discarded. As the camera is now on/monitoring is being performed, it can be assumed that the next QR code, QR2, will be detected reasonably soon after it appears. However, if there is a shift in ambient lighting or movement of the device that causes the camera adjusts its focus, for example, QR2 may still not be identified at the exact time it changed (even ignoring processing delays). In the embodiment shown, QR2 is detected/identified at t=4.390 s. A time interval due to a processing delay can be assumed to be at least substantially constant in the embodiment being described—the time interval between identifying QR2 and identifying QR3 (or any subsequent pair of consecutive QR codes) should therefore at least substantially match the QR change rate (2 seconds) if there are no focusing issues or similar. The approach of this embodiment therefore "waits" until two consecutive QR codes which are correctly spaced are identified. It is unlikely that two focus adjustment issues would occur and introduce a similar delay for two consecutive QR codes, so, if, for example, a second code is detected 500 ms late due to camera motion preventing prompt identification, the chances of also seeing the third code close to 500 ms late are slimmer, which means the space between QR2 and QR3 will not match the configured 2 second interval, indicating that one or both was affected by a processing issue or similar and cannot be relied upon.

In the example illustrated in FIG. 9, taking the time point of detection of QR2 as the time point of the appearance of QR2 would lead to a substantial error (around 400 ms), which is likely to be too large for audio matching. The system "waits" for the detection of a third QR code, QR3, to check for any such issues. QR3 is detected at t=6.095 s, making the time between the second and third code detections 1.705 s—this is an error of 295 ms as compared to the known interval of two seconds, which may be deemed too large an error for audio matching. A further QR code, QR4, is therefore awaited and detected at t=8.135 s. The time interval between QR3 and QR4 is 2.040 s—in the embodiment shown, this is seen as an acceptable error, so the time at which QR4 is detected is used for synchronisation of the audio content. It will be appreciated that FIG. 9 highlights the time between detection so as to account for camera focusing issues and similar; the apparent 135 ms processing delay in detecting QR4 at 8 seconds may be compensated for separately. The system may wait for as many codes as desired to be detected until the interval between a consecutive pair (or multiple consecutive pairs) is deemed satisfactory. Additional confidence in identification accuracy is provided by waiting for more codes, at the cost of either greater overall time to synchronisation, or placing different codes closer together (e.g. at a spacing of 1 second or 0.5 seconds).

Further, in the example shown in FIG. 9, the interval between the detections of QR2 and QR3 is less than the known interval between QR code changes—it can therefore be inferred that the speed of detection has "improved", as QR3 must have been identified sooner after it first appeared than QR2 was. By contrast, when a subsequent QR code is not identified until after an interval greater than the known interval between QR code changes, the time point of identification of that subsequent QR code may be discarded purely because it can be inferred to be late. The use of regularly-changing markers, changing at a known frequency, can therefore be used to improve accuracy and reliability whilst still providing relatively fast time point identification.

As used herein, the term "visual feature" may refer to the presence of a specific image (be that an added marker, or an integral part of the original video content selected for display), or to the appearance or disappearance of a specific image (a visual change). For example, in high frame-rate video content, matching the audio to within the time-period of display of the frame may be sufficient, rather than needing a more precise identification of a time of change in frame. A visual feature may be used to identify a set time-point directly, or to identify a key frame, for which a corresponding set time point is then identified.

It will be appreciated that visual markers may also be used in pre-recorded video content, in addition to, or instead of, using features of the underlying video content 12 itself, in some embodiments. The applicability of markers is therefore not limited to live broadcasts.

Added markers may have particular utility in pre-recoded video with similar content on groups of consecutive images—for example footage of waves on a beach—in which it may be difficult to accurately and reliably identify a given frame without a marker.

The changing visual markers of various embodiments may be thought of as providing an optically-readable "clock" specifically for the video content 12 in question, allowing a precise time point to be identified. The accurate identification of the time point allows accurate synchronisation to be performed. The changing visual markers may effectively provide a "time" of zero corresponding to the start of the video footage (and therefore to the appearance of the first frame, which includes the first QR code), and later QR codes may reflect an elapsed period from the start of the video content. In some embodiments, this information may be used to provide information to a user—for example prompting the second device 20 to inform a user that the content has just started/is mid-way through/is nearly over, and optionally also a re-start time (e.g. for looped footage).

Once a set timepoint has been identified, by any approach described herein, in some embodiments the method further comprises requesting that a browser "pre-seeks" to a point in the audio content a further offset into the future, e.g. 2 seconds (configurable), to provide a "window" in which the most common network delays and any processing time required for that seeking can be accommodated. A flag may then be set to begin playing the audio content only once this final interval has elapsed. In some implementations, a frame processing loop (which by this point has completed its job of identifying the visual feature(s) and so is doing no other work) may be used. This may be preferable to using a standard setTimeout( ) method of a browser, as setTimeout( ) can be unreliable, in that it only guarantees to run when "at least" the specified interval has elapsed (not necessarily exactly the specified interval), and has been found to produce variable results.

In light of the preceding description and accompanying figures, a wide variety of possible implementations for the synchronisation of audio content with both live and pre-recorded video content 12 will therefore be apparent to the skilled person. The specific examples described herein are provided by way of explanatory example only, and are not limiting on the scope of the disclosure.

The invention claimed is:

1. A method of synchronising audio content arranged to be played by a second device with video content played by a first device, wherein the second device comprises a camera, and the video content played by the first device has corresponding audio content and is pre-processed to generate a dataset of at least one visual feature suitable for image detection, and a set time point in the video content for each visual feature, the set time point being the time point at which the visual feature disappears, the method comprising:
  capturing at least a portion of the video content with the camera;
  performing image recognition on the captured video content to identify one of the selected visual features within the video content and identify when the identified visual feature disappears; and
  commencing playing the audio content from a selected time point in the audio content corresponding to the set time point in the video content, by reference to the dataset, such that the audio content is synchronous with the video content.

2. The method of claim 1, wherein the performing image recognition comprises identifying a key frame within the video content based on disappearance of the visual feature, the key frame corresponding to the set time point in the video content.

3. The method of claim 2, wherein the selected time point is selected by adding a processing delay allowance to the set time point, to allow for the time elapsed between capturing the key frame and commencing playing of the audio content.

4. The method of claim 2, wherein the performing image recognition on the captured video content comprises identifying a plurality of key frames, and wherein the method comprises identifying a pair of key frames with a known time interval between the two, and wherein the commencing playing the audio content is not performed until the second key frame of the pair has been identified.

5. The method of claim 2, wherein the image recognition is performed by a plurality of trackers, each arranged to search for one particular key frame.

6. The method of claim 5, wherein each tracker samples frames at a sampling rate less than the frame rate, and wherein a plurality of trackers are assigned to the same key frame, the trackers having offset sampling times.

7. The method of claim 5, wherein a plurality of trackers are assigned to different key frames which are close together in time relative to the length of the video content.

8. The method of claim 2, wherein the performing image recognition on the captured video content comprises detecting an image of an entity within a frame, and identifying the first frame in which that entity is no longer visible as a key frame.

9. The method of claim 2, wherein the method is performed for synchronising previously-recorded audio content with a display of previously-recorded video content, wherein frames of the video content suitable for use as key frames are identified in advance, and wherein a plurality of key frames are identified in advance, and wherein only a subset of these key frames are sought in the step of performing image recognition, the subset being identified based on comparing a current time to an estimated start time of playing of the video content.

10. The method of claim 1, wherein the pre-processing comprises incorporating at least one QR code into the video content to be played, each QR code providing a visual feature suitable for image detection, and wherein the captured video content includes a first QR code, and wherein the set time-point is the time-point of the disappearance of the first QR code.

11. The method of claim 10, wherein the captured video content includes a second QR code, and wherein the set time-point is the time-point at which the first QR code is replaced with the second QR code.

12. The method of claim 1, wherein the method is performed for synchronising live or near-live audio and video content, and wherein advance knowledge of an image due to be present in the video content is used to trigger playing of the live or near-live audio.

13. The method of claim 1, wherein the pre-processing comprises selecting a frame of the video content based on properties of a still image of the frame being suitable for image detection such that a visual feature suitable for image detection is identified within the original video content, without addition of a marker to the video content.

14. The method of claim 1, wherein the pre-processing comprises adding a marker to at least one frame of the video content so as to provide a visual features suitable for image detection.

15. A method of preparing video reference data for use in synchronising audio content arranged to be played by a second device with video content played by a first device, wherein the second device comprises a camera arranged to capture at least a portion of the video content played by the first device, the method comprising:
  reviewing the video content to identify frames within the video content suitable for use as key frames to be identified by image recognition, each key frame corresponding to a set time point in the audio and video content;

generating a dataset of reference copies of key frames and corresponding time points of the key frames; and providing the generated dataset for use by the second device.

16. The method of claim 15, wherein the reference copy of a key frame is generated by applying at least one transformation to the identified key frame of the original video content.

17. The method of claim 15, wherein multiple different reference copies are generated for each key frame, each reference copy of the same key frame being generated to facilitate image recognition of the key frame under different second device conditions, and wherein a plurality of datasets are generated and wherein the providing the generated dataset to the second device comprises one of:
  (i) providing the relevant dataset based on device type of the second device;
  (ii) providing the relevant dataset based on weather conditions of the second device;
  (iii) providing the relevant dataset based on geographical location of the second device; and
  (iv) providing the relevant dataset based on current time.

18. A non-transitory computer-readable medium in which computer program instructions are stored, which instructions, when read by a computational device, cause the computational device to perform the steps of:

capturing, using a camera, at least a portion of displayed video content;

performing image recognition on the captured video content to identify within the video content a visual feature listed in a dataset, and when the identified visual feature disappears, the disappearance of the visual feature having a corresponding set time point in the video content, and thereby in corresponding audio content, listed in the dataset; and commencing playing the audio content from a selected time point in the audio content corresponding to the set time point, such that the audio content is synchronous with the video content.

19. The non-transitory computer-readable medium of claim 18, wherein the performing image recognition comprises identifying a key frame within the video content, the key frame corresponding to the set time point in the audio content.

20. The non-transitory computer-readable medium of claim 19, wherein the performing image recognition comprises searching for the key frame in the captured video content based on a reference copy of the key frame provided in advance to the computational device.

* * * * *